Feb. 25, 1969   T. ORNAS, JR., ET AL   3,430,229
UNITARY SIGNAL DEVICE HAVING FRONT AND SIDE SIGNAL AREAS
Filed Jan. 11, 1968   Sheet 1 of 2
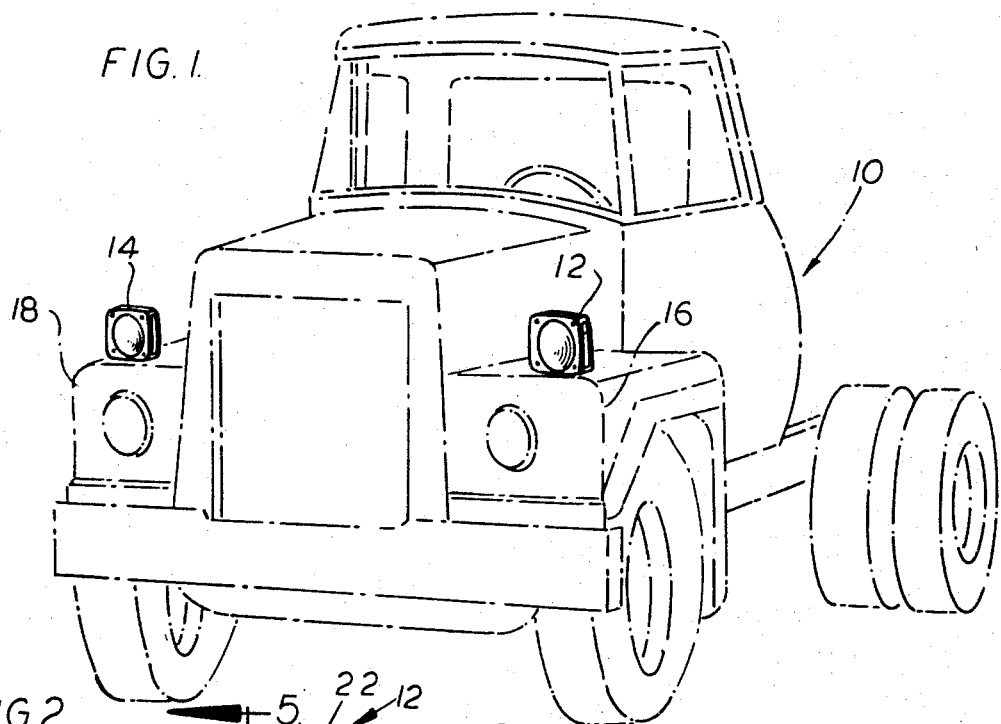
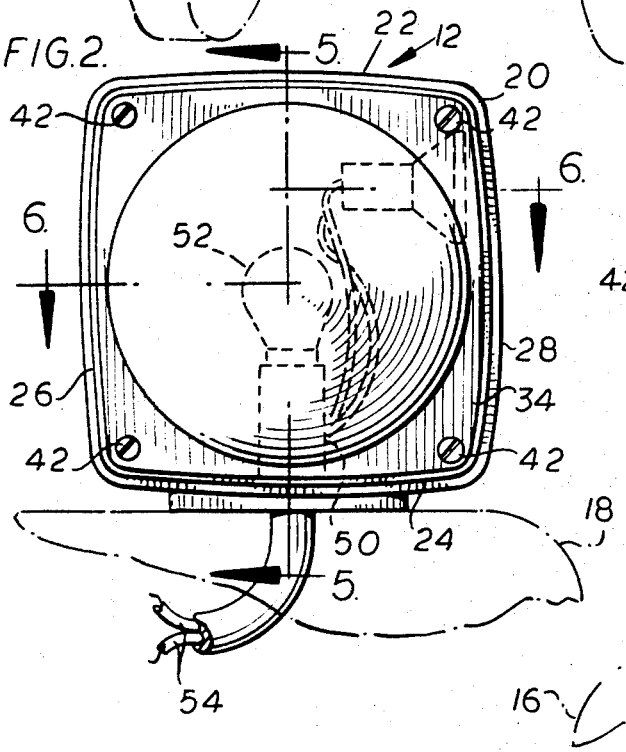
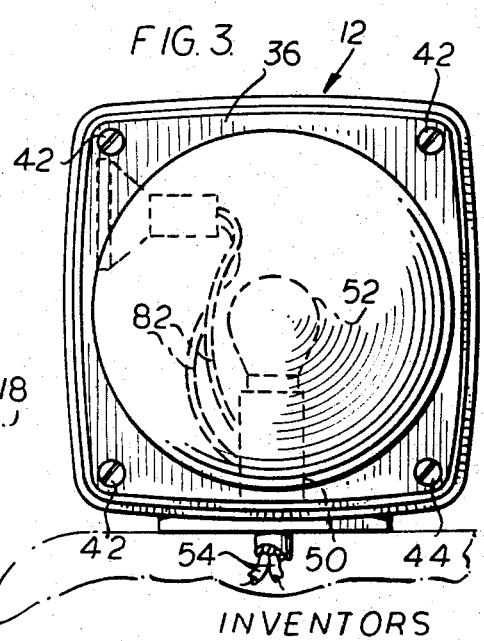
INVENTORS
THEODORE ORNAS, JR
DEO   LEWTON
ATT'Y

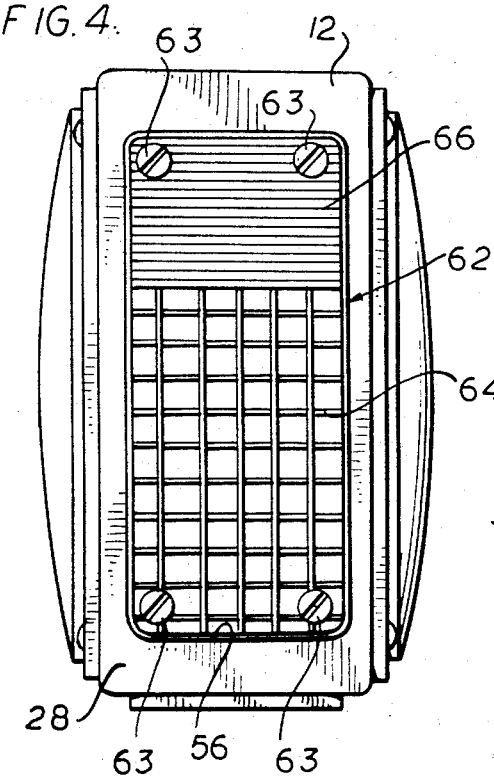
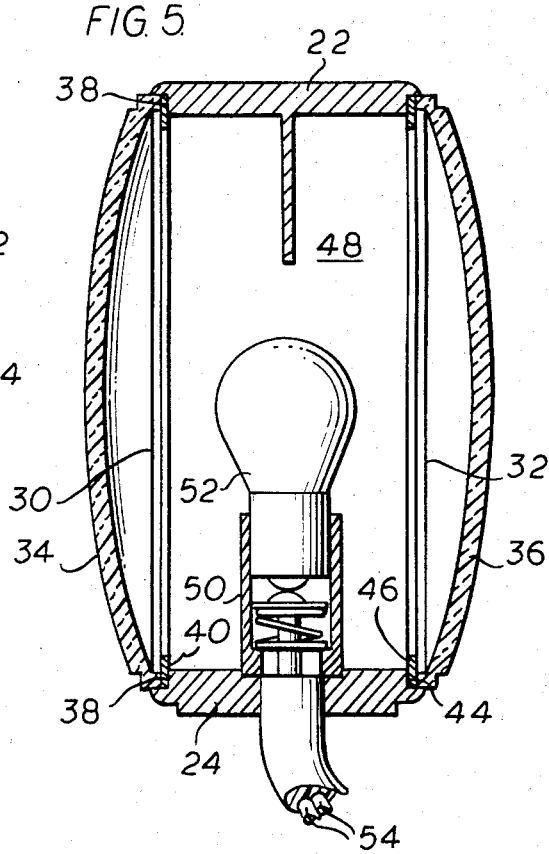
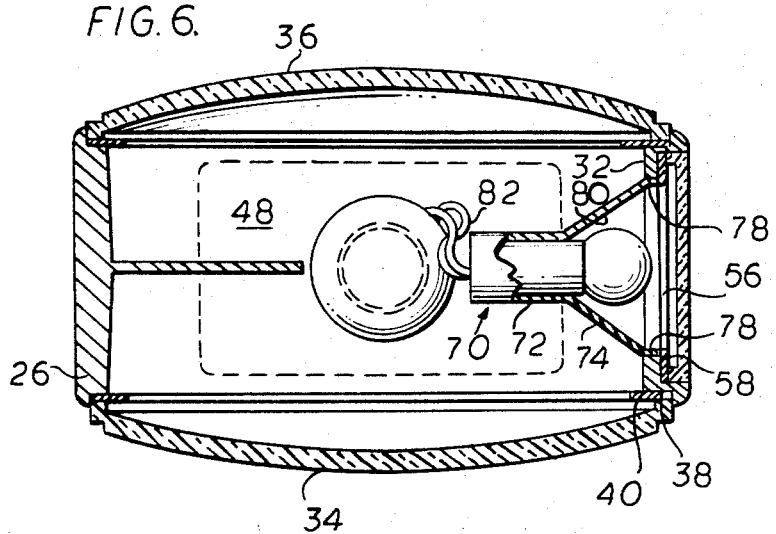

United States Patent Office 3,430,229
Patented Feb. 25, 1969

3,430,229
UNITARY SIGNAL DEVICE HAVING FRONT
AND SIDE SIGNAL AREAS
Theodore Ornas, Jr., and Deo Lewton, Fort Wayne, Ind., assignors to International Harvester Company, Chicago, Ill., a corporation of Delaware
Filed Jan. 11, 1968, Ser. No. 697,212
U.S. Cl. 340—383                                       7 Claims
Int. Cl. B60q 1/34; G09f 13/16

ABSTRACT OF THE DISCLOSURE

A unitary signal lamp for use on automotive vehicles and the like incorporating lighted turning signal means viewable from both front and rear, a side marker signal light and a side reflector signal. All of these signal means are conveniently incorporated in a compact unitary assembly.

---

This invention relates to indicating devices for automotive vehicles to indicate to other vehicle operators and pedestrians the position and direction of movement of the vehicle.

Safety requirements for the operation of automobiles, trucks and other road vehicles are constantly being revised to raise the standards and promote increasingly effective ways to avoid accidents between vehicles and between vehicles and pedestrians. Governmental agencies, both State and Federal, are prescribing lighting requirements for vehicles whereby the position of a vehicle and the intended movement thereof may be ascertained easily by drivers of other vehicles and pedestrians.

Accordingly, it is a principal object of this invention to provide signal light means which may be used to signal the left or right movement of a vehicle and also indicate the position of the vehicle.

Another object is to provide a unitary signal lamp and reflector assembly to accomplish the functions of indicating the intended turning movements of a vehicle and the position of the vehicle when viewed from a position out of the line of direction of movement of the vehicle.

The above and other objects and advantages of the invention will be more readily apparent when read in conjunction with the accompanying drawings in which:

FIGURE 1 shows a vehicle having mounted on the front left and right fenders thereof signal lamps embodying the invention;

FIGURE 2 is an enlarged front elevational view of the signal lamp shown mounted on the left front fender in FIGURE 1;

FIGURE 3 is an enlarged rear elevational view of the signal lamp of FIGURE 2;

FIGURE 4 is a right side elevational view of the signal lamp of FIGURE 2 showing a side marker portion and a reflector portion of the lamp;

FIGURE 5 is an elevation view in section taken along line 5—5 of FIGURE 2;

FIGURE 6 is a plan view in section taken along the line 6—6 of FIGURE 2.

Referring now to the drawings, FIGURE 1 shows a truck cab 10 with left and right signal lamps 12 and 14 mounted respectively on left and right fenders 16 and 18. The signal lamps are identical except that certain parts thereof are reversed depending on whether the lamp is placed on the right or left side of the vehicle. Accordingly, only one lamp will be described in detail. The signal lamp 12 comprises a mounting frame 20 having top and bottom sides 22 and 24, and left and right sides 26 and 28 as viewed in FIGURE 2. These preferably are formed integrally with each other to define a substantially square structure. The frame 20 may be cast of metal. Oppositely disposed openings 30 and 32 are defined by the four sides. A front lens member 34 and a rear lens member 36 cover the openings 30 and 32 respectively. The front lens member 34 usually is an amber color and the rear lens member 36 usually is red.

The mounting frame edge adjacent opening 30 may be formed with a recess 38 extending around the edge into which a suitable gasket 40 may be inserted. The lens member 34 may be secured over the gasket 40 to the mounting frame 20 by suitable means such as a plurality of self tapping screws 42. A similar recess 44 may be formed in the mounting frame edge on the opposite side adjacent opening 32, into which a suitable gasket 46 may be inserted. The lens member 36 then may be secured over the gasket 46 by self-tapping screws 42.

The mounting frame 20 and the lens members 34 and 36 define a lighting chamber 48 in which a light is disposed in such a manner that when lighted both the front amber lens 34 and rear red lens 36 are illuminated. A light bulb socket assembly 50 for holding a light bulb 52 is supported in the lower side 24 by suitable means. Suitable electrical wiring 54 connected to an electrical source (not shown) is connected into socket assembly 50 to light the bulb as desired.

In the side 28 an elongated rectangular opening 56 is formed. A recess 58 is formed in the mounting frame surrounding opening 56 into which a gasket 60 may be fitted. A lens means 62 is secured to the mounting frame over the gasket 60 to completely cover the opening 56 by means of self tapping screws 63. The lens means 62 includes two portions 64 and 66. The lower portion 64 is a reflex reflector lens which glows only when light rays from some other source strike it as, for instance, from the headlights of other vehicles. This reflector lens 64 is not affected by the light source 52 in the lighting chamber 48.

The upper portion 66 comprises a translucent material, capable of transmitting light from a second light bulb source 68 disposed adjacent the portion 66. The signal lamp 12 would be mounted so that light from the light source 68 is directed to the left side of the truck cab 10, i.e., transversely to the longitudinal axis of the vehicle. For the signal lamp 14 on the right side of the vehicle, of course, the light from a bulb similar to 68 would be directed to the right side of the vehicle. The light source 68 normally would be on at all times like an automobile headlight while the vehicle is in motion to serve as a sidemarker. It will be appreciated that the relative lower and upper positions of the portions 64 and 66 could be reversed.

The light bulb 68 is mounted in a light bulb socket assembly 70 which in turn is supported in the mounting frame 20. The assembly 70 comprises a base portion 72 which receives the bulb 68. A conical portion 74 attached to or formed integrally with the base portion 72 is supported in the frame 20 by suitable means such as cooperative engagement between edge 76 of conical portion 74 and opening 78 in the frame 20. The conical portion 74 together with the base portion 72 is effective to enclose the bulb 68 so that when the latter is lighted the light therefrom will be confined and be prevented from striking the front and rear lens members 34 and 36. The inner surface 80 of conical portion 74 is a reflective surface which directs the light outwardly through side marker lens 66. Electrical wiring 82 is connected into the socket assembly 70 and is adapted to be attached to a source of electrical energy on the vehicle.

The unitary signal lamp construction has the advantage of presenting a structure which serves several functions pursuant to safety requirements established by governmental agencies. Within the unitary construction there is included a turn signal indicator light, a side marker light and a side reflector unit. Incorporating all of these features, in a single unit reduces installation time on the vehicle and requires only one mounting operation instead of three for individual devices to perform the three functions.

We claim:

1. A unitary light signal indicator assembly comprising:
   a mounting frame;
   turn signal lens means supported on said mounting frame; a reflex reflector lens supported on said frame and disposed substantially normal to said turn signal lens means;
   a translucent side marker lens also supported on said frame substantially normal to said turn signal lens means and disposed in substantially co-planar relationship with said reflex reflector lens and adjacent thereto; and
   light bulb socket means adapted to be connected to an electrical source for holding light bulb means adapted to light up said turn signal lens means and said side marker lens.

2. The combination of claim 1 wherein said turn signal lens means includes horizontally spaced front and rear lenses supported in opposite sides of said mounting frame.

3. The combination of claim 1 wherein said light bulb socket means includes
   a first light bulb socket assembly for a turn signal indicator light, and
   a second light bulb socket assembly for a side marker light.

4. The combination of claim 3 including
   means associated with said second light bulb socket assembly for confining the light emitted by a light bulb adapted to be associated therewith so that no light therefrom will be directed through said turn signal lens means.

5. The combination of claim 3 including
   reflector means associated with said second light bulb socket assembly for directing light through said side marker lens.

6. The combination of claim 3 including
   means associated with said second light bulb socket assembly for confining the light emitted by a light bulb adapted to be associated therewith so that no light therefrom will be directed through said turn signal lens means, and
   reflector means for directing light through said side marker lens, said reflector means forming part of said confining means.

7. The combination of claim 3 including
   means on said mounting frame for supporting said reflector means thereon.

References Cited

UNITED STATES PATENTS 3,273,117   9/1966   Martauz _____ 340—89 X

JOHN W. CALDWELL, *Primary Examiner.*

H. I. PITTS, *Assistant Examiner.*

U.S. Cl. X.R.
240—8.24; 340—100, 98